United States Patent
Lai (10) Patent No.: US 12,474,778 B2
(45) Date of Patent: Nov. 18, 2025

(54) HEAD-MOUNTED DISPLAY, TAP INPUT SIGNAL GENERATING METHOD AND NON-TRANSITORY COMPUTER READABLE STORAGE MEDIUM THEREOF

(71) Applicant: HTC Corporation, Taoyuan (TW)

(72) Inventor: Chao-Hsiang Lai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/430,681

(22) Filed: Feb. 2, 2024

(65) Prior Publication Data

US 2025/0251792 A1      Aug. 7, 2025

(51) Int. Cl.
| | |
|---|---|
| *G06F 3/01* | (2006.01) |
| *G06F 3/0346* | (2013.01) |
| *G06T 7/20* | (2017.01) |
| *G06T 7/70* | (2017.01) |

(52) U.S. Cl.
CPC ............ *G06F 3/014* (2013.01); *G06F 3/0346* (2013.01); *G06T 7/20* (2013.01); *G06T 7/70* (2017.01); *G06F 2203/0331* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 2011/0060985 A1* | 3/2011 | Kerr | .................... | G06F 3/04812 |
| | | | | 715/702 |
| 2014/0104168 A1* | 4/2014 | Hegde | ..................... | G06F 3/005 |
| | | | | 345/157 |
| 2015/0195092 A1* | 7/2015 | Bartkiewicz | .......... | H04L 9/3247 |
| | | | | 713/176 |
| 2015/0326985 A1* | 11/2015 | Priyantha | .............. | G06F 1/3287 |
| | | | | 381/56 |
| 2017/0010680 A1* | 1/2017 | Bryant | ................ | G06F 3/04883 |
| 2019/0265781 A1* | 8/2019 | Kehoe | ................... | G06F 3/0304 |
| 2019/0286224 A1 | 9/2019 | De Nardi et al. | | |
| 2020/0050268 A1 | 2/2020 | Wu et al. | | |

FOREIGN PATENT DOCUMENTS

| | | |
|---|---|---|
| CN | 106125939 A | 11/2016 |
| CN | 109364471 A | 2/2019 |
| CN | 110794960 A | 2/2020 |
| TW | 201530353 A | 8/2015 |
| TW | 202340927 A | 10/2023 |

OTHER PUBLICATIONS

The office action of the corresponding Taiwanese application No. TW113131371 issued on May 28, 2025.

* cited by examiner

*Primary Examiner* — Andre L Matthews
(74) *Attorney, Agent, or Firm* — CKC & Partners Co., LLC (57) ABSTRACT

A head-mounted display, tap input signal generating method, and non-transitory computer readable storage medium thereof are provided. The method determines whether a plurality of fingers conform to a contact mode corresponding to an entity plane based on a plurality of real-time images including the fingers of a user and an inertial sensing data. The method generates a target finger trajectory based on the real-time images and the inertial sensing data in response to the fingers conforming to the contact mode corresponding to the entity plane. The method generates a tap input signal corresponding to the fingers based on a target input type and the target finger trajectory.

13 Claims, 7 Drawing Sheets

HEAD-MOUNTED DISPLAY, TAP INPUT SIGNAL GENERATING METHOD AND NON-TRANSITORY COMPUTER READABLE STORAGE MEDIUM THEREOF

BACKGROUND

Field of Invention

The present invention relates to a head-mounted display, tap input signal generating method, and non-transitory computer readable storage medium thereof. More particularly, the present invention relates to a head-mounted display, tap input signal generating method, and non-transitory computer readable storage medium thereof that can accurately generate a tap input signal.

Description of Related Art

In recent years, various technologies related to virtual reality have developed rapidly, and various technologies and applications of head-mounted displays have been proposed one after another.

In the prior art, when a user wears a head-mounted display with inside-out tracking positioning, the head-mounted display can directly identify input signals input by the user's hand movements through computer vision.

However, simply identifying the user's hand movements through computer vision may result in incorrect identification of tap input signals or incoherence of tap input signals due to image occlusion and other problems.

In addition, since it is difficult for computer vision to identify the movements of smaller hand parts (e.g., the fingers), it also increases the possibility of misjudgment of tap input signals.

Accordingly, there is an urgent need for a tap input signal generating technology that can accurately generate a tap input signal.

SUMMARY

An objective of the present disclosure is to provide a head-mounted display. The head-mounted display comprises an image capturing device and a processor, and the processor is electrically connected to the image capturing device. The image capturing device is configured to capture a plurality of real-time images including a plurality of fingers of a user, wherein the user wears at least one wearable device on at least one of the fingers, and the at least one wearable device is configured to generate an inertial sensing data. The processor determines whether the fingers conform to a contact mode corresponding to an entity plane based on the real-time images and the inertial sensing data. The processor generates a target finger trajectory based on the real-time images and the inertial sensing data in response to the fingers conforming to the contact mode corresponding to the entity plane. The processor generates a tap input signal corresponding to the fingers based on a target input type and the target finger trajectory.

Another objective of the present disclosure is to provide a tap input signal generating method, which is adapted for use in an electronic apparatus. The tap input signal generating method comprises the following steps: determining, based on a plurality of real-time images including a plurality of fingers of a user and an inertial sensing data, whether the fingers conform to a contact mode corresponding to an entity plane based on the real-time images and the inertial sensing data, wherein the user wears at least one wearable device on at least one of the fingers, and the at least one wearable device is configured to generate the inertial sensing data; generating a target finger trajectory based on the real-time images and the inertial sensing data in response to the fingers conforming to the contact mode corresponding to the entity plane; and generating a tap input signal corresponding to the fingers based on a target input type and the target finger trajectory.

A further objective of the present disclosure is to provide a non-transitory computer readable storage medium having a computer program stored therein. The computer program comprises a plurality of codes, the computer program executes a tap input signal generating method after being loaded into an electronic apparatus. The tap input signal generating method comprises the following steps: determining, based on a plurality of real-time images including a plurality of fingers of a user and an inertial sensing data, whether the fingers conform to a contact mode corresponding to an entity plane based on the real-time images and the inertial sensing data, wherein the user wears at least one wearable device on at least one of the fingers, and the at least one wearable device is configured to generate the inertial sensing data; generating a target finger trajectory based on the real-time images and the inertial sensing data in response to the fingers conforming to the contact mode corresponding to the entity plane; and generating a tap input signal corresponding to the fingers based on a target input type and the target finger trajectory.

According to the above descriptions, the tap input signal generating technology (at least including the head-mounted display, the method, and the non-transitory computer readable storage medium) provided in the present disclosure determines whether the fingers conform to the contact mode corresponding to the entity plane by analyzing the real-time images and the inertial sensing data corresponding to the plurality of fingers of the user. Next, the tap input signal generating technology provided by the present disclosure can initial the operation of generating the target finger trajectory based on the real-time images and the inertial sensing data only when in the contact mode, and generate the tap input signal corresponding to the fingers based on the target input type and the target finger trajectory. Since the tap input signal generating technology provided in the present disclosure can further use the inertial sensing data of the wearable device to assist in determining whether it is in contact mode, and cooperate with the results of computer vision identification to assist in generating the corresponding target finger trajectory, solving the problem of misjudgment that may occur only through computer vision identification. Therefore, the tap input signal generating technology provided by the present disclosure improves the accuracy of the tap input signal.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a head-mounted display, tap input signal generating method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
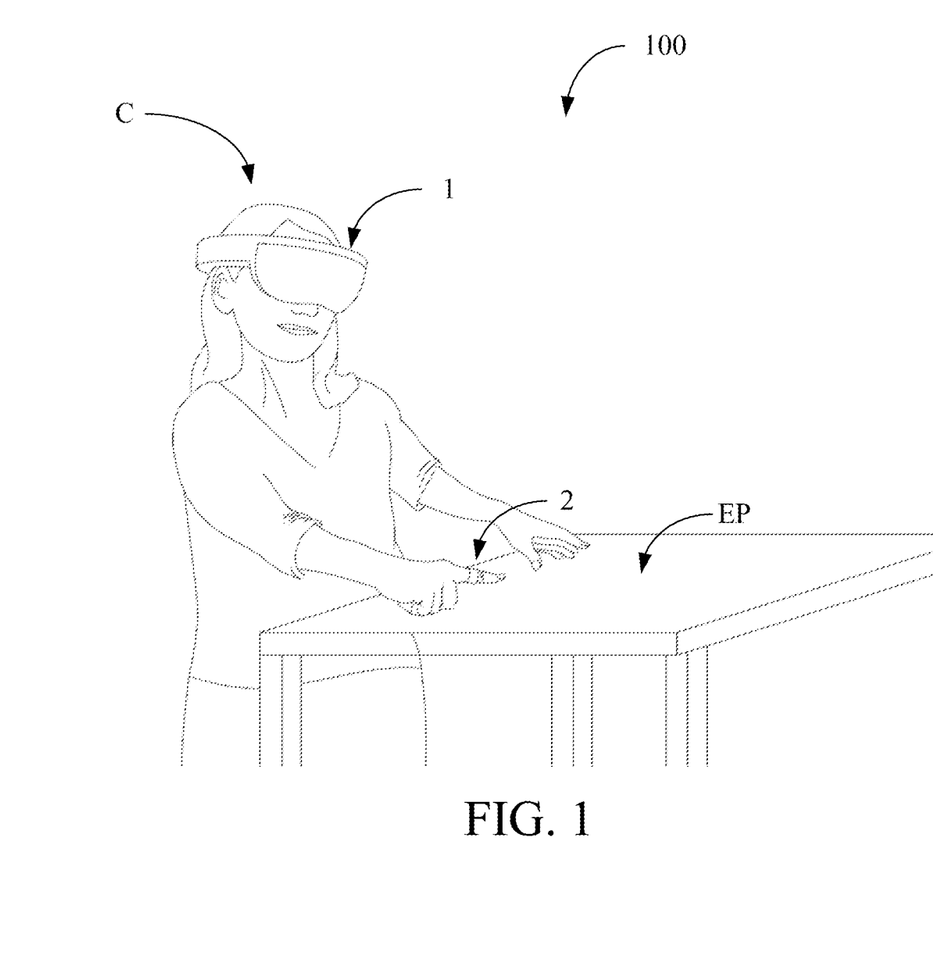
FIG. 1 is a schematic diagram depicting the application environment of the head-mounted display of the first embodiment.

First, the applicable scene of the present embodiment will be described, and a schematic diagram of which is depicted in FIG. 1. As shown in FIG. 1, in the application environment schematic diagram 100 of the present disclosure, a user C may use a head-mounted display 1, and the user C may wear at least one wearable device 2 on her/his hand (e.g., the user C wears a smart ring on the index finger of the right hand) to perform tap input operations corresponding to the display screen of the head-mounted display 2.

In some embodiments, a system that implements a tap input signal generating method comprises a head-mounted display 1 and a wearable device 2, and the head-mounted display 1 is communicatively connected to the wearable device 2.

Figure 2:
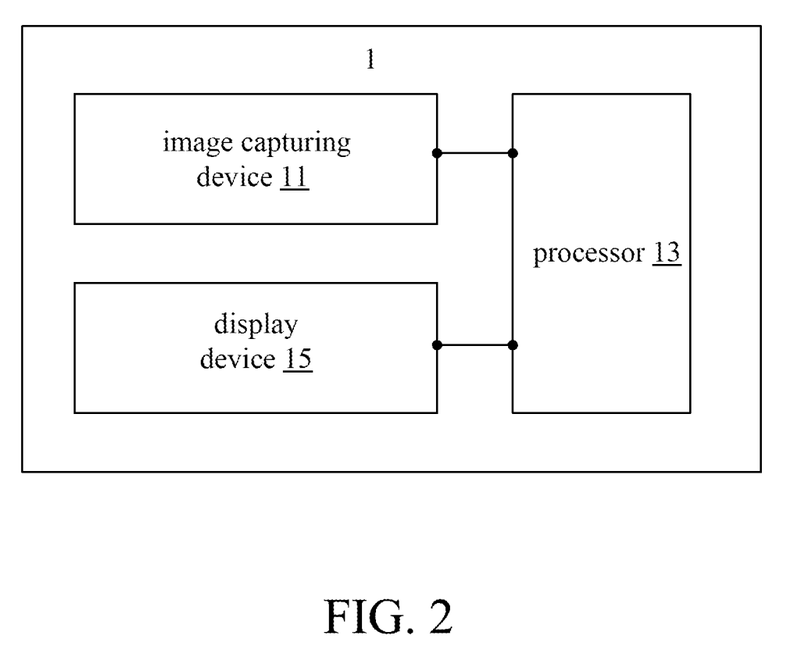
FIG. 2 is a schematic diagram depicting the head-mounted display of some embodiments.

In the present embodiment, a schematic diagram of the structure of the head-mounted display 1 is depicted in FIG. 2. The head-mounted display 1 comprises an image capturing device 11, a processor 13, and a display device 15. The processor 13 is electrically connected to the image capturing device 11 and the display device 15. The image capturing device 11 may comprise a plurality of image capturing units (e.g., a plurality of depth camera lenses) for capturing a plurality of real-time images including the wearable device 2 worn on a hand of the user C.

Figure 3:
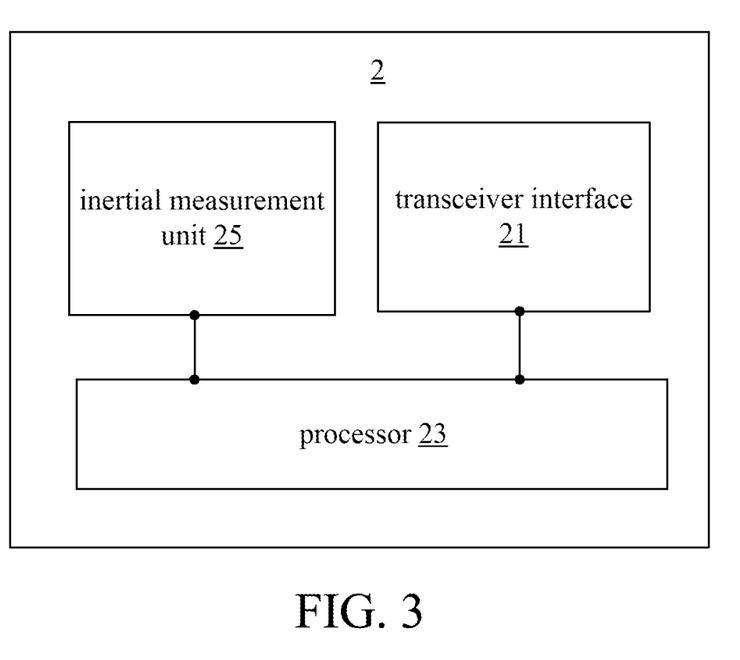
FIG. 3 is a schematic diagram depicting the wearable device of some embodiments.

In the present embodiment, a schematic diagram of the structure of the wearable device 2 is depicted in FIG. 3. The wearable device 2 comprises a transceiver interface 21, a processor 23, and an inertial measurement unit 25. The processor 23 is electrically connected to the transceiver interface 21 and the inertial measurement unit 25. The inertial measurement unit 25 is configured to detect the inertial sensing data corresponding to the hand part of the user C wearing the wearable device 2.

Specifically, the inertial measurement unit 25 may continuously generate a series of inertial sensing data (e.g., a stream of inertial sensing data generated at a frequency of 1000 times per second), and each of the inertial sensing data may comprises an acceleration and an angular velocity.

During operation, the head-mounted display 1 may periodically receive the inertial sensing data from the wearable device 2.

It shall be appreciated that the inertial sensing data generated by the wearable device 2 may correspond to the body parts of the user C (e.g., the body part of the finger). For example, the user C may wear the wearable device 2 on any finger to collect data. For convenience of description, in the present embodiment, the user C may be described wearing the wearable device 2 on the index finger.

It shall be appreciated that the transceiver interface 21 is an interface capable of receiving and transmitting data or other interfaces capable of receiving and transmitting data and known to those of ordinary skill in the art. The transceiver interface can receive data from sources such as external apparatuses, external web pages, external applications, and so on. The processor 13 and the processor 23 may be any of various processors, Central Processing Units (CPUs), microprocessors, digital signal processors or other computing apparatuses known to those of ordinary skill in the art.

It shall be appreciated that FIG. 1 is merely an example for illustration, and the present disclosure does not limit the content of the system implementing the tap input signal generating method. For example, the present disclosure does not limit the number of wearable devices 2 connected to the head-mounted display 1. The head-mounted display 1 may be connected to a plurality of wearable devices through the network at the same time, depending on the scale and actual requirements of the system.

For ease of understanding, an operational process of the present disclosure is briefly described. Please refer to the operation diagram 500 in FIG. 5. In the present example, the processor 13 first performs operation S501 to receive data from the image capturing device 11 and the wearable device 2. Then, based on the data, the processor 13 executes operation S503 to determine whether the current user's action is in the contact mode. If the determination result is no, the processor 13 returns to continue executing operation S501.

Figure 5:
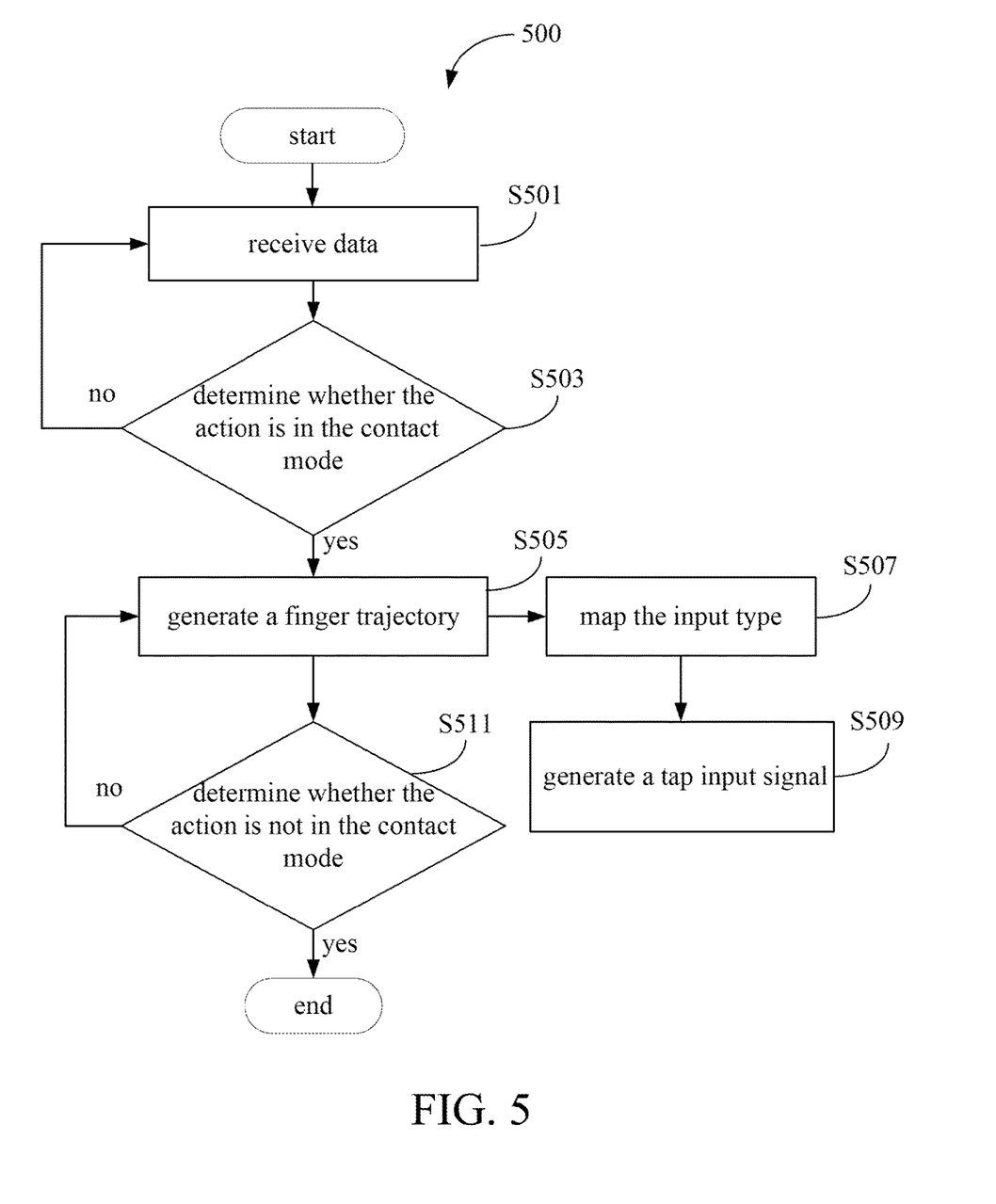
FIG. 5 is a schematic diagram depicting the operations of some embodiments.

If the determination result is yes, the processor 13 executes operation S505 to generate a finger trajectory. Next, the processor 13 executes operation S507 to map the input type, and executes operation S507 to generate a tap input signal.

In addition, after the processor 13 executes operation S505, S511 is executed to determine whether the current user's action is not in the contact mode. If the determination result is yes, the processor 13 ends this continuous action determination. If the determination result is no, the processor 13 continues to execute operation S505 to generate the finger trajectory.

Next, the following paragraphs will detail the specific details of the operations, please refer to FIG. 1. In the present embodiment, the processor 13 determines whether the fingers conform to a contact mode corresponding to an entity plane EP based on the real-time images and the inertial sensing data.

It shall be appreciated that the disclosure does not limit the shape or size of the entity plane EP. The entity plane EP can be any flat plane in the physical space (for example: desktop, wall, user's leg surface, etc.).

In some embodiments, the processor 13 may first perform a plane detection operation (e.g., through a trained deep learning model) based on the real-time images to search for the entity plane EP in the real-time images.

In some embodiments, when determining whether it is in contact mode, the processor 13 may first analyze the user's finger position through computer vision. When it is determined that the user's finger position is located on the entity plane EP, the inertial sensing data is further used to determine whether it is in contact mode.

Specifically, the processor 13 determines whether the user's fingers are located on the entity plane EP based on the real-time images. Then, in response to the fingers being locating on the entity plane EP, the processor 13 determines whether the fingers correspond to a finger tapping down action based on the inertial sensing data. Finally, in response to the fingers corresponding to the finger tapping down action, the processor 13 determines the fingers conform to the contact mode corresponding to the entity plane EP.

In some embodiments, the processor 13 can determine whether the fingers are located on the entity plane EP by calculating the distance between the user's fingers and the entity plane EP. Specifically, the processor 13 calculates a plurality of distances between the fingers of the user and the entity plane EP based on the real-time images. Then, the processor 13 determines the fingers are located on the entity plane EP in response to the distance being less than a preset threshold.

In some embodiments, the processor 13 can determine that the fingers are located on the entity plane EP when only some of the fingers meet the distance condition (for example: the user's index finger and middle finger fall within the preset distance of the entity plane EP).

In some embodiments, the processor 13 can determine the finger tapping down action through a trained deep learning model (such as a neural network model), wherein the deep learning model uses a large amount of historical inertial sensing data to perform deep learning on determining the finger tapping down action.

In some embodiments, in order to save determining and computing resources, the processor 13 does not continue to execute the operation of generating the tap input signal when it is determined that the contact mode is not met.

For example, in response to the fingers not being located on the entity plane EP, the processor 13 determines the fingers do not conform to the contact mode corresponding to the entity plane EP. Next, in response to determining the fingers do not conform to the contact mode corresponding to the entity plane EP, the processor 13 does not generate the tap input signal corresponding to the fingers.

For another example, in response to the fingers not corresponding to the finger tapping down action, the processor 13 determines the fingers do not conform to the contact mode corresponding to the entity plane EP. Next, in response to determining the fingers do not conform to the contact mode corresponding to the entity plane EP, the processor 13 does not generate the tap input signal corresponding to the fingers.

Next, in the present embodiment, the processor 13 generates a target finger trajectory based on the real-time images and the inertial sensing data in response to the fingers conforming to the contact mode corresponding to the entity plane EP.

In some embodiments, the processor 13 can adjust the finger trajectory generated based on computer vision through the inertial sensing data. Specifically, in response to the fingers conform to the contact mode corresponding to the entity plane EP, the processor 13 generates a first finger trajectory corresponding to the fingers based on the real-time images. Next, the processor 13 generates the target finger trajectory based on the first finger trajectory corresponding to the fingers and the inertial sensing data.

Figure 6:
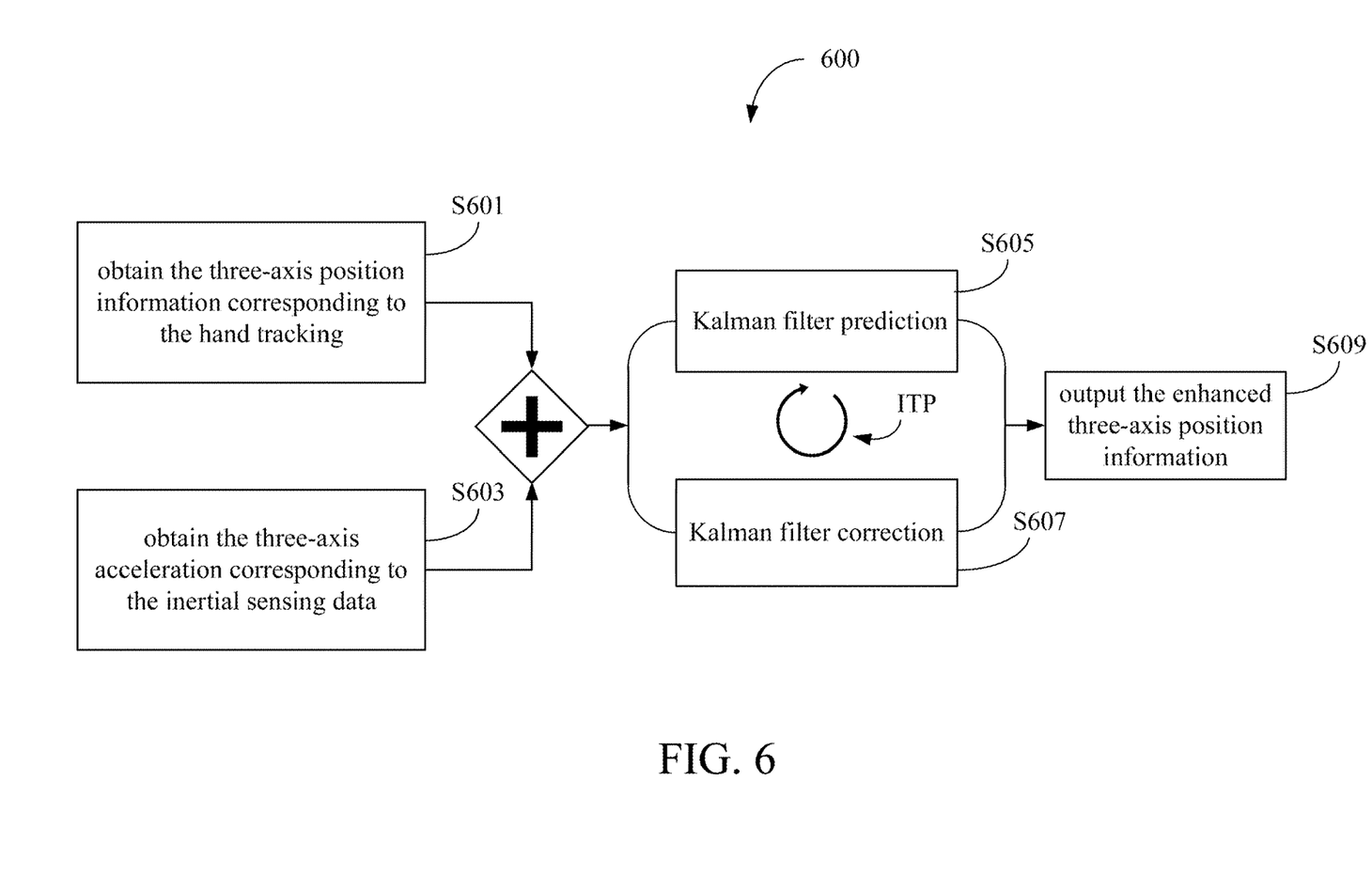
FIG. 6 is a schematic diagram depicting the operation of location information integration of some embodiments.

For example, please refer to the location information integration operation diagram 600 in FIG. 6. In the present example, the processor 13 can execute operation S601 and operation S603 to obtain the three-axis position information corresponding to the hand tracking (i.e., the position corresponding to the XYZ axis) and the three-axis acceleration corresponding to the inertial sensing data. Then, after integrating the aforementioned two types of data, the processor 13 performs Kalman filter prediction in operation S605 and Kalman filter correction in operation S607, and performs a plurality of iterative processes ITP. Finally, the processor 13 executes operation S609 to output the enhanced three-axis position information.

Finally, in the present embodiment, the processor 13 generates a tap input signal corresponding to the fingers based on a target input type and the target finger trajectory.

In some embodiments, the target input type is determined by the processor 13 judging the target object displayed on the display device 15. Specifically, the head-mounted display 1 further comprises a display device 15 for displaying a target object. The processor 13 determines an input type corresponding to the target object to select the target input type from a plurality of candidate input types.

For example, when the target object is a canvas, a signature area, etc., the processor 13 determines that the appropriate target input type is a writing type (i.e., the tap input signal is the movement trajectory of the fingers on the entity plane EP). Specifically, in response to the target input type being a writing type, the processor 13 calculates a displacement path corresponding to the target finger trajectory on the entity plane EP to generate the tap input signal corresponding to the fingers.

In some embodiments, the processor 13 may also determine that when a finger (e.g., thumb) is detected to tap on the wearable device 2, switch the corresponding function (e.g., switch brush, switch color, undo, redo). For example, when the processor 13 determines that there is one tap, the function of switching brushes is executed; when the processor 13 determines that there are two taps, the function of switching colors is executed.

For another example, when the target object is a menu, a drop-down field, etc., the processor 13 determines that the appropriate target input type is a cursor type (i.e., the tap input signal is the operation of the finger on the entity plane EP). Specifically, in response to the target input type being a cursor type, the processor 13 selects a target cursor action from a plurality of cursor actions based on the target finger trajectory. Then, the processor 13 generates the tap input signal corresponding to the fingers based on the target finger trajectory and the target cursor action.

In some embodiments, the processor 13 can switch appropriate cursor actions based on the target finger trajectory (e.g., move the cursor, click the left button, click the right button, scroll up/down, hold left click).

For example, when the processor 13 determines that the finger moves, it executes the function of moving the cursor. When the processor 13 determines that an instant finger tap has occurred, it performs the function of clicking the left button. When the processor 13 determines that an instant two finger tap has occurred (e.g., the index finger and the middle finger), it performs the function of clicking the right button. When the processor 13 determines that two fingers are tapping and sliding up and down at the same time, the scroll up/down function is executed. When the processor 13 determines that an instant double finger tap have occurred, it performs the function of holding the left clicking.

For another example, when the target object is an input field (e.g., inputting an account and password), the processor 13 determines that the appropriate target input type is a keyboard type (i.e., the tap input signal is the operation input of the fingers on the virtual keyboard corresponding to the entity plane EP). Specifically, in response to the target input type being a keyboard type, the processor 13 calculates a tap position corresponding to the target finger trajectory on the entity plane EP to generate the tap input signal corresponding to the fingers (i.e., generating an output signal based on the key contents of the virtual keyboard).

Figure 4:
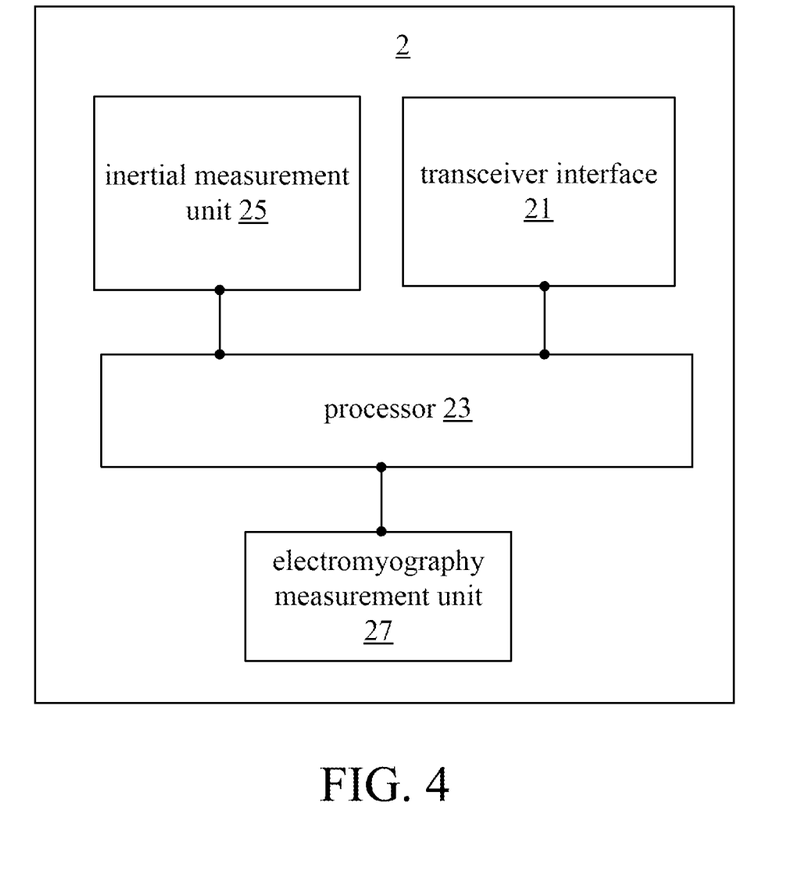
FIG. 4 is a schematic diagram depicting the wearable device of some embodiments.

In some embodiments, the processor 13 may further refer to an electromyography (EMG) signal to generate the target finger trajectory. For example, as shown in FIG. 4, the wearable device 2 may further comprise an electromyography measurement unit 27, and the electromyography measurement unit 27 is electrically connected to the processor 23. The electromyography measurement unit 27 is configured detect an electromyography signal corresponding to the hand of the user C wearing the wearable device 2.

In some embodiments, when the wearable device 2 comprises the electromyography measurement unit 27, the processor 13 compares the electromyography signal with a plurality of gesture electromyography signals (e.g., recorded gesture electromyography signals of each finger) to identify finger movements corresponding to the electromyography signal.

According to the above descriptions, the head-mounted display 1 provided in the present disclosure determines whether the fingers conform to the contact mode corresponding to the entity plane by analyzing the real-time images and the inertial sensing data corresponding to the plurality of fingers of the user. Next, the head-mounted display 1 provided by the present disclosure can initial the operation of generating the target finger trajectory based on the real-time images and the inertial sensing data only when in the contact mode, and generate the tap input signal corresponding to the fingers based on the target input type and the target finger trajectory. Since the head-mounted display 1 provided in the present disclosure can further use the inertial sensing data of the wearable device to assist in determining whether it is in contact mode, and cooperate with the results of computer vision identification to assist in generating the corresponding target finger trajectory, solving the problem of misjudgment that may occur only through computer vision identification. Therefore, the head-mounted display 1 provided by the present disclosure improves the accuracy of the tap input signal.

Figure 7:
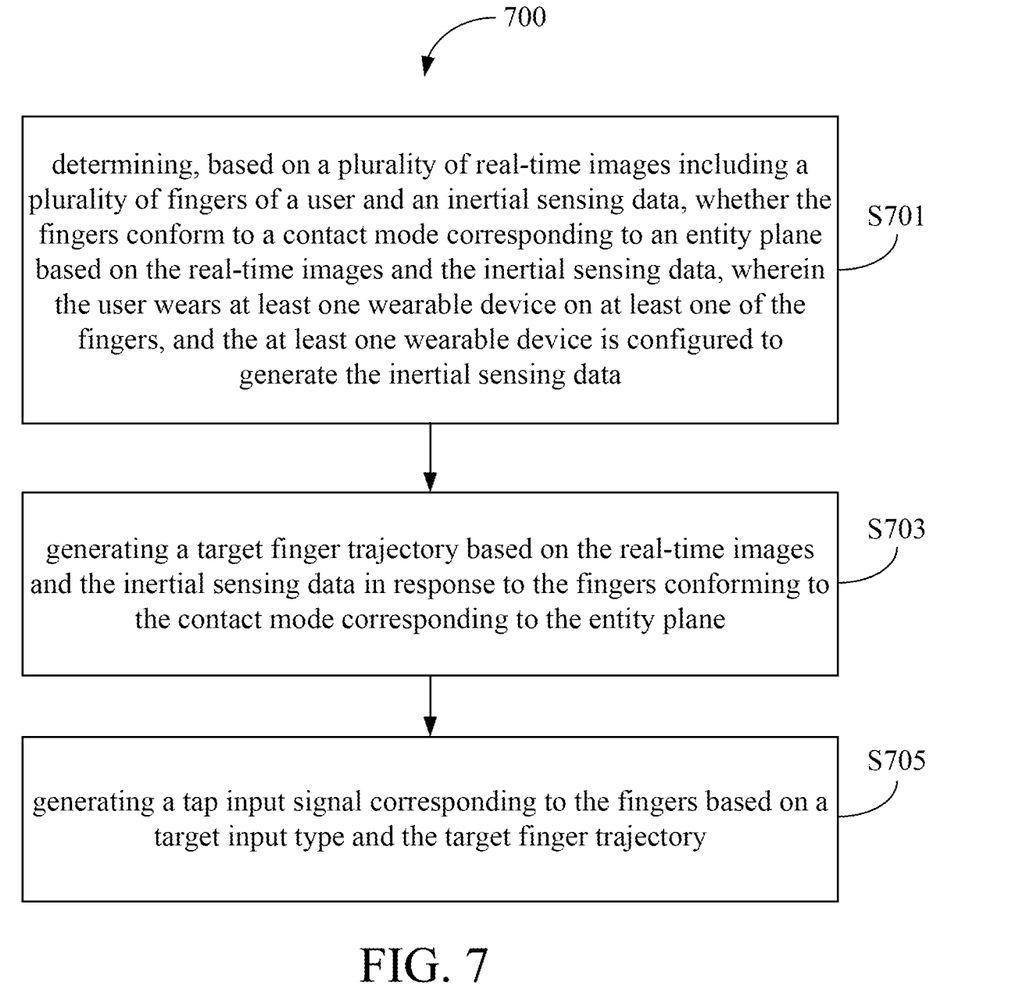
FIG. 7 is a partial flowchart depicting the tap input signal generating method of the second embodiment.

A second embodiment of the present disclosure is a tap input signal generating method and a flowchart thereof is depicted in FIG. 7. The tap input signal generating method 700 is adapted for an electronic apparatus (e.g., the head-mounted display 1 described in the first embodiment). The tap input signal generating method 700 generates a tap input signal through the steps S701 to S705.

In the step S701, the electronic apparatus determines, based on a plurality of real-time images including a plurality of fingers of a user and an inertial sensing data, whether the fingers conform to a contact mode corresponding to an entity plane based on the real-time images and the inertial sensing data, wherein the user wears at least one wearable device on at least one of the fingers, and the at least one wearable device is configured to generate the inertial sensing data.

Next, in the step S703, the electronic apparatus generates a target finger trajectory based on the real-time images and the inertial sensing data in response to the fingers conforming to the contact mode corresponding to the entity plane.

Finally, in the step S705, the electronic apparatus generates a tap input signal corresponding to the fingers based on a target input type and the target finger trajectory.

In some embodiments, wherein the step of determining whether the fingers conform to the contact mode corresponding to the entity plane comprises the following steps: determining whether the fingers of the user are located on the entity plane based on the real-time images; determining whether the fingers correspond to a finger tapping down action based on the inertial sensing data in response to the fingers locating on the entity plane; and determining the fingers conform to the contact mode corresponding to the entity plane in response to the fingers corresponding to the finger tapping down action.

In some embodiments, wherein the step of determining whether the fingers of the user are located on the entity plane comprises the following steps: calculating a plurality of distances between the fingers of the user and the entity plane based on the real-time images; and determining the fingers are located on the entity plane in response to the distance being less than a preset threshold.

In some embodiments, the tap input signal generating method 700 further comprises the following steps: determining the fingers do not conform to the contact mode corresponding to the entity plane in response to the fingers not being located on the entity plane; and not generating the tap input signal corresponding to the fingers in response to determining the fingers do not conform to the contact mode corresponding to the entity plane.

In some embodiments, the tap input signal generating method 700 further comprises the following steps: determining the fingers do not conform to the contact mode corresponding to the entity plane in response to the fingers not corresponding to the finger tapping down action; and not generating the tap input signal corresponding to the fingers in response to determining the fingers do not conform to the contact mode corresponding to the entity plane.

In some embodiments, the step of generating the target finger trajectory comprises the following steps: generating a first finger trajectory corresponding to the fingers based on the real-time images in response to the fingers conform to the contact mode corresponding to the entity plane; and generating the target finger trajectory based on the first finger trajectory corresponding to the fingers and the inertial sensing data.

In some embodiments, the step of generating the tap input signal corresponding to the fingers comprises the following steps: in response to the target input type being a writing type, calculating a displacement path corresponding to the target finger trajectory on the entity to generate the tap input signal corresponding to the fingers.

In some embodiments, the step of generating the tap input signal corresponding to the fingers comprises the following steps: in response to the target input type being a cursor type, selecting a target cursor action from a plurality of cursor actions based on the target finger trajectory; and generating the tap input signal corresponding to the fingers based on the target finger trajectory and the target cursor action.

In some embodiments, the step of generating the tap input signal corresponding to the fingers comprises the following steps: in response to the target input type being a keyboard type, calculating a tap position corresponding to the target finger trajectory on the entity plane to generate the tap input signal corresponding to the fingers.

In addition to the aforesaid steps, the second embodiment can also execute all the operations and steps of the head-mounted display 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The tap input signal generating method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the head-mounted display 1), the computer program executes the tap input signal generating method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

According to the above descriptions, the tap input signal generating technology (at least including the head-mounted display, the method, and the non-transitory computer readable storage medium) provided in the present disclosure determines whether the fingers conform to the contact mode corresponding to the entity plane by analyzing the real-time images and the inertial sensing data corresponding to the plurality of fingers of the user. Next, the tap input signal generating technology provided by the present disclosure can initial the operation of generating the target finger trajectory based on the real-time images and the inertial sensing data only when in the contact mode, and generate the tap input signal corresponding to the fingers based on the target input type and the target finger trajectory. Since the tap input signal generating technology provided in the present disclosure can further use the inertial sensing data of the wearable device to assist in determining whether it is in contact mode, and cooperate with the results of computer vision identification to assist in generating the corresponding target finger trajectory, solving the problem of misjudgment that may occur only through computer vision identification. Therefore, the tap input signal generating technology provided by the present disclosure improves the accuracy of the tap input signal.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A head-mounted display, comprising:
   an image capturing device, being configured to capture a plurality of real-time images including a plurality of fingers of a user, wherein the user wears at least one wearable device on at least one of the fingers, and the at least one wearable device is configured to generate an inertial sensing data; and
   a processor, being electrically connected to the image capturing device, and being configured to perform the following operations:
      determining whether the fingers conform to a contact mode corresponding to an entity plane based on the real-time images and the inertial sensing data;
      generating a target finger trajectory based on the real-time images and the inertial sensing data in response to the fingers conforming to the contact mode corresponding to the entity plane; and
      generating a tap input signal corresponding to the fingers based on a target input type and the target finger trajectory;
   wherein the head-mounted display further comprises:
   a display device, being electrically connected to the processor, wherein the display device is configured to display a target object,
   wherein the processor is further configured to perform the following operations:
      judging the target object displayed on the display device; and
      determining an input type corresponding to the target object displayed on the display device to select the target input type from a plurality of candidate input types,
   wherein:
      in response to the processor judging the target object to be a canvas or a signature area, the processor selects the target input type to be a writing type, and calculates a displacement path corresponding to the target finger trajectory on the entity plane to generate the tap input signal corresponding to the fingers;
      in response to the processor judging the target object to be a menu or a drop-down field, the processor selects the target input type to be a cursor type, selects a target cursor action from a plurality of cursor actions based on the target finger trajectory, and generates the tap input signal corresponding to the fingers based on the target finger trajectory and the target cursor action; and
      in response to the processor judging the target object to be an input filed of inputting an account and password, the processor selects the target input type to be a keyboard type, and calculates a tap position corresponding to the target finger trajectory on the entity plane to generate the tap input signal corresponding to the fingers, such that an output signal is generated based on key contents of a virtual keyboard.

2. The head-mounted display of claim 1, wherein the operation of determining whether the fingers conform to the contact mode corresponding to the entity plane comprises the following operations:
   determining whether the fingers of the user are located on the entity plane based on the real-time images;

determining whether the fingers correspond to a finger tapping down action based on the inertial sensing data in response to the fingers locating on the entity plane; and determining the fingers conform to the contact mode corresponding to the entity plane in response to the fingers corresponding to the finger tapping down action.

3. The head-mounted display of claim 2, wherein the operation of determining whether the fingers of the user are located on the entity plane comprises the following operations:

calculating a plurality of distances between the fingers of the user and the entity plane based on the real-time images; and determining the fingers are located on the entity plane in response to the distance being less than a preset threshold.

4. The head-mounted display of claim 2, wherein the processor is further configured to perform the following operations:

determining the fingers do not conform to the contact mode corresponding to the entity plane in response to the fingers not being located on the entity plane; and not generating the tap input signal corresponding to the fingers in response to determining the fingers do not conform to the contact mode corresponding to the entity plane.

5. The head-mounted display of claim 2, wherein the processor is further configured to perform the following operations:

determining the fingers do not conform to the contact mode corresponding to the entity plane in response to the fingers not corresponding to the finger tapping down action; and not generating the tap input signal corresponding to the fingers in response to determining the fingers do not conform to the contact mode corresponding to the entity plane.

6. The head-mounted display of claim 1, wherein the operation of generating the target finger trajectory comprises the following operations:

generating a first finger trajectory corresponding to the fingers based on the real-time images in response to the fingers conform to the contact mode corresponding to the entity plane; and generating the target finger trajectory based on the first finger trajectory corresponding to the fingers and the inertial sensing data.

7. A tap input signal generating method, being adapted for use in an electronic apparatus, wherein the tap input signal generating method comprises the following steps:

determining, based on a plurality of real-time images including a plurality of fingers of a user and an inertial sensing data, whether the fingers conform to a contact mode corresponding to an entity plane based on the real-time images and the inertial sensing data, wherein the user wears at least one wearable device on at least one of the fingers, and the at least one wearable device is configured to generate the inertial sensing data;

generating a target finger trajectory based on the real-time images and the inertial sensing data in response to the fingers conforming to the contact mode corresponding to the entity plane; and generating a tap input signal corresponding to the fingers based on a target input type and the target finger trajectory;

wherein the electronic apparatus further comprises:

a display device, wherein the display device is configured to display a target object, wherein the tap input signal generating method further comprises the following steps:

judging the target object displayed on the display device; and determining an input type corresponding to the target object displayed on the display device to select the target input type from a plurality of candidate input types, wherein:

in response to the electronic apparatus judging the target object to be a canvas or a signature area, the electronic apparatus selects the target input type to be a writing type, and calculates a displacement path corresponding to the target finger trajectory on the entity plane to generate the tap input signal corresponding to the fingers;

in response to the electronic apparatus judging the target object to be a menu or a drop-down field, the electronic apparatus selects the target input type to be a cursor type, selects a target cursor action from a plurality of cursor actions based on the target finger trajectory, and generates the tap input signal corresponding to the fingers based on the target finger trajectory and the target cursor action; and in response to the electronic apparatus judging the target object to be an input filed of inputting an account and password, the electronic apparatus selects the target input type to be a keyboard type, and calculates a tap position corresponding to the target finger trajectory on the entity plane to generate the tap input signal corresponding to the fingers, such that an output signal is generated based on key contents of a virtual keyboard.

8. The tap input signal generating method of claim 7, wherein the step of determining whether the fingers conform to the contact mode corresponding to the entity plane comprises the following steps:

determining whether the fingers of the user are located on the entity plane based on the real-time images;

determining whether the fingers correspond to a finger tapping down action based on the inertial sensing data in response to the fingers locating on the entity plane; and determining the fingers conform to the contact mode corresponding to the entity plane in response to the fingers corresponding to the finger tapping down action.

9. The tap input signal generating method of claim 8, wherein the step of determining whether the fingers of the user are located on the entity plane comprises the following steps:

calculating a plurality of distances between the fingers of the user and the entity plane based on the real-time images; and determining the fingers are located on the entity plane in response to the distance being less than a preset threshold.

10. The tap input signal generating method of claim 8, wherein the tap input signal generating method further comprises the following steps:

determining the fingers do not conform to the contact mode corresponding to the entity plane in response to the fingers not being located on the entity plane; and not generating the tap input signal corresponding to the fingers in response to determining the fingers do not conform to the contact mode corresponding to the entity plane.

11. The tap input signal generating method of claim 8, wherein the tap input signal generating method further comprises the following steps:
determining the fingers do not conform to the contact mode corresponding to the entity plane in response to the fingers not corresponding to the finger tapping down action; and
not generating the tap input signal corresponding to the fingers in response to determining the fingers do not conform to the contact mode corresponding to the entity plane.

12. The tap input signal generating method of claim 7, wherein the step of generating the target finger trajectory comprises the following steps:
generating a first finger trajectory corresponding to the fingers based on the real-time images in response to the fingers conform to the contact mode corresponding to the entity plane; and
generating the target finger trajectory based on the first finger trajectory corresponding to the fingers and the inertial sensing data.

13. A non-transitory computer readable storage medium, having a computer program stored therein, wherein the computer program comprises a plurality of codes, the computer program executes a tap input signal generating method after being loaded into an electronic apparatus, the tap input signal generating method comprises the following steps:
determining, based on a plurality of real-time images including a plurality of fingers of a user and an inertial sensing data, whether the fingers conform to a contact mode corresponding to an entity plane based on the real-time images and the inertial sensing data, wherein the user wears at least one wearable device on at least one of the fingers, and the at least one wearable device is configured to generate the inertial sensing data;
generating a target finger trajectory based on the real-time images and the inertial sensing data in response to the fingers conforming to the contact mode corresponding to the entity plane; and
generating a tap input signal corresponding to the fingers based on a target input type and the target finger trajectory;
wherein the electronic apparatus further comprises:
a display device, wherein the display device is configured to display a target object,
wherein the tap input signal generating method further comprises the following steps:
judging the target object displayed on the display device; and
determining an input type corresponding to the target object displayed on the display device to select the target input type from a plurality of candidate input types,
wherein:
in response to the electronic apparatus judging the target object to be a canvas or a signature area, the electronic apparatus selects the target input type to be a writing type, and calculates a displacement path corresponding to the target finger trajectory on the entity plane to generate the tap input signal corresponding to the fingers;
in response to the electronic apparatus judging the target object to be a menu or a drop-down field, the electronic apparatus selects the target input type to be a cursor type, selects a target cursor action from a plurality of cursor actions based on the target finger trajectory, and generates the tap input signal corresponding to the fingers based on the target finger trajectory and the target cursor action; and
in response to the electronic apparatus judging the target object to be an input filed of inputting an account and password, the electronic apparatus selects the target input type to be a keyboard type, and calculates a tap position corresponding to the target finger trajectory on the entity plane to generate the tap input signal corresponding to the fingers, such that an output signal is generated based on key contents of a virtual keyboard.

* * * * *